United States Patent Office 3,414,546
Patented Dec. 3, 1968

3,414,546
AROMATIC POLYAMIDE-ESTERS FROM AMINO ARYL DICARBOXYLIC ACID DIESTERS
James H. Werntz, Wilmington, Del., assignor to E. I. du Pont de Nemours and Company, Wilmington, Del., a corporation of Delaware
No Drawing. Continuation of application Ser. No. 395,069, Sept. 8, 1964. This application Apr. 14, 1967, Ser. No. 630,848
11 Claims. (Cl. 260—78)

ABSTRACT OF THE DISCLOSURE

New polyamide-esters of the recurring unit

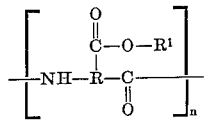

process of making them and their corresponding polyimides the esters being useful as adhesives and coatings and the polyimides as films and other shaped articles.

RELATED APPLICATION

This is a continuation of copending Ser. No. 395,069, filed Sept. 8, 1964, and now abandoned.

BACKGROUND OF THE INVENTION

The importance of relatively stable intermediates that can be easily converted to the final desired product can be appreciated by one skilled in the art. The final products, the aromatic polyimides, are known for their chemical and thermal stability. Since they do not melt easily nor dissolve easily, the difficulty of shaping this polymer into useful articles is a serious obstacle to commercial development. Recently, processes utilizing the shaping of a polyamide-acid intermediate followed by conversion to the polyimide have been proposed. However, the polyamide-acids, in many cases, tend to convert to polyimides during storage or, in some cases, are of high stability, converting only upon exposure to temperatures which are extremely high for organic materials.

It is an object of this invention to provide intermediates that are sufficiently stable to be stored for long periods, yet sufficiently "unstable" to convert relatively easily to polyimide when desired.

A particular object of this invention is to provide such intermediates and having an A–B type polymer structure. Such polymers have a much more compact structure than those of the AA–BB type and furthermore have the advantage of ready control of molar ratios of components. Additionally, the polymers of this invention can be easily prepared from low-cost starting materials.

SUMMARY

The objects of this invention are accomplished by the use of an intermediate linear polymer, an aromatic polyamide-ester having the formula:

(1)

where R is a trivalent aromatic hydrocarbon group of 1 or 2 rings; $R^1$ is of the group consisting of an aryl hydrocarbon group of 1 or 2 rings and from 6 through 10 carbon atoms and an alkyl hydrocarbon group; and $n$ is an integer sufficiently high to provide a polymer having an inherent viscosity at 30° C. of at least 0.04, preferably 0.3–5.0, as measured as an 0.5% by weight solution in a suitable solvent such as N,N-dimethylacetamide.

The process for producing such polyamide-esters broadly involves heating an appropriate aminoaryl dicarboxylic acid diester. Such diester can be a diaryl ester or a monoaryl monoalkyl ester of the selected amino aromatic dicarboxylic acid. When a monoaryl monoalkyl ester is used, the alkyl group will preferably contain 1 to 5 carbons.

A preferred group of starting materials are the diphenyl esters of 3-aminophthalic acid, 4-aminophthalic acid and 3-aminonaphthalic acid (the 1,8-dicarboxylic acid). Other suitable esters are the diphenyl esters of 2-aminonaphthalic acid, 4-aminonaphthalic acid, 4-aminonaphthalene-1,2-carboxylic acid, 5-amino-naphthalene-2,3-dicarboxylic acid, as well as the tolyl and naphthyl esters of any of these dicarboxylic acids.

Also suitable are monoaryl monoalkyl esters such as the phenyl methyl ester of 3-aminophthalic acid and the phenyl ethyl ester of 4-aminophthalic acid. These latter two compounds are among the preferred starting materials.

These esters are prepared by conventional techniques known in the literature. For instance, the aminophthalic acid can be heated with phenyl acetate to produce the diphenyl ester. The hydrochloride of 3-aminophthalic acid can be converted by thionyl chloride to the diacid chloride, which then reacts with two moles of phenol to produce the diphenyl ester. The mixed esters such as phenyl methyl can be made by treatment of 3-aminophthalic anhydride with methanol, followed by conversion to the hydrochloride of the amine, then reaction of the free acid group with thionyl chloride to produce the monoester monoacid chloride, and then reaction with phenol.

The polyamide-esters of this invention are prepared by simply heating the aminoaryl dicarboxylic acid diesters at a high enough temperature to split out the elements of the phenol. Considerable heat sometimes is required to drive this molecule from the reaction mixture. It is not essential, however, to remove all of it; in fact, some residual phenol is considered to be beneficial as a plasticizer for the polyamide-ester. A representative heating range is about 100–200° C.

It should be noted that the reaction mixture itself can be used as a self-curing adhesive. This mixture can be used conveniently as an adhesive film. Simple thermal curing produces a polyimide layer. These operations can be used in coating various substrates uniformly even though they may be porous and/or have irregular surfaces. Coated materials which can be bonded to themselves or to other materials include aluminum foil, steel sheeting, plywood, Masonite, paper, glass, asbestos, and various fabrics and films made of these and other substances.

The polyamide-ester composition can be stored at this point for later use or it can be immediately used to form shaped articles. After shaping the composition composed predominantly of the polyamide-ester either immediately or after storage or after sale into a useful article, e.g. filament, film, tube, rod powder, etc., and drying the article, it is preferred to convert the polyamide-ester to another polymer to modify the properties of the shaped structure. Thus, the polyamide-ester can be converted by heat treatment, preferably under vacuum, to the corresponding polyimide, specifically by heating to a temperature of at least 175° C., preferably 200° to 300° C., to drive off alcohol.

Instead of being shaped itself, the intermediate polyamide-ester polymer can be used as a coating composition. The polymer composition, either alone or modified by the addition of fillers and/or foaming agents, may be applied by any of the usual techniques (doctoring, rolling, dipping, brushing, spraying) to a great variety of substrates. Such substrates include copper, brass, aluminum, steel, and other metals in the form of sheets, fibers, wires, screening; mineral structures such as asbestos; glass in the form of sheets, fibers, foams, fabrics, etc.; polymeric materials such as cellulosic materials (cellophane, wood, paper, etc.), polyolefins (polyethylene, polypropylene, polystyrene, etc.), polyesters (polyethylene terephthalate, etc.), polyamides, polyimides, perfluorocarbon polymers (polytetrafluoroethylene, copolymers of tetrafluoroethylene with hexafluoropropylene, etc.), polyurethanes, in the form of sheets, fibers, foams, woven and non-woven fabrics, screening, etc.; leather sheets; etc. The polymeric substrates can be metallized before coating, or treated with a conventional adhesive or other agent to improve surface receptivity. Films of the final polymer can be laminated to any of the above substrates, often with the aid of a commercially available adhesive. Instead of using a fluid or semi-solid polyamide-ester composition as a coating on one or both pieces to be adhered together, or of using a polyamide-ester film as an intermediate adhesive layer, one can use similarly an adhesive sheet made by impregnating a paper or fabric with a fluid polyamide-acid composition, e.g., an adhesive tape.

The polyamide-esters when isolated are found to be colorless or light yellow solids. They have strong infrared bands at 3.0–3.07 microns due to N—H bonds of the amide, 5.8 microns due to C=O bonds of the ester and 6.05 microns due to C=O bonds of the amide.

As mentioned above, the polyamide-esters of this invention are readily converted, either prior to or after forming into a shaped article, by heating to the corresponding polyimide, which has the following formula:

(2)

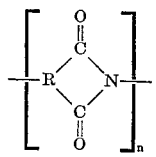

where R and $n$ have the same meaning as in Formula 1 above.

These polyimides have outstanding physical and chemical properties which make them very useful as shaped structures such as self-supporting films, fibers, filaments, and the like. The structures are characterized by high tensile properties, desirable electric properties and remarkable stability to heat and water. These polyimides have the particular advantages of built-in stoichiometric balance and control, as well as the low cost of the starting materials.

The final shaped article may consist of the polyimide alone or as a blend with other polymers and/or modified with inert materials. Depending on their nature, the inert materials can be added before or after shaping. For example, fillers such as pigments, electrically conductive carbon black and metal particles, abrasives, dielectrics and lubricating polymers can be added conveniently to the intermediate polymer as such or in a solution of the intermediate polymer before shaping. Certain abrasives and electrically conductive materials are better added as surface layers. A cellular form or foam of the final polymer may be produced by adding a conventional blowing agent to the intermediate polymer, either alone or in combination with a filler, followed by heating to decompose the agent and form the polyimide composition. Alternatively, cellular products can be made by dispersing bubbles (of air, carbon dioxide, nitrogen, etc.) into a melt or solution of the intermediate polymer before shaping and conversion to the polyimide.

As mentioned above, the inherent viscosity of the polymers of this invention is measured at 30° C. at a concentration of 0.5% by weight of the polymer in a suitable solvent, e.g., N,N-dimethylacetamide. To calculate inherent viscosity, the viscosity of the polymer solution is measured relative to that of the solvent alone.

Inherent viscosity =

$$\frac{\text{natural logarithm } \frac{\text{viscosity of solution}}{\text{viscosity of solvent}}}{C}$$

where C is the concentration expressed in grams of polymer per 100 milliliters of solution. As known in the polymer art, inherent viscosity is directly related to the molecular weight of the polymer.

The invention will be more clearly understood by referring to the examples which follow, in which parts and percentages are by weight unless otherwise indicated. It is understood that the examples, although illustrating specific embodiments of the present invention, should not be considered limitative of the invention.

Example 1

The hydrochloride of 3-aminophthalic acid, diphenyl ester, is prepared by the reaction of the hydrochloride of 3-aminophthalic acid with two moles of phenyl acetate. As this ester is heated slowly from about 115° C. to about 200° C., the reaction mass becomes a semisolid and phenol distills out as the polymerization proceeds. The polyamide-ester formed in this first stage heating is transferred to a polymer tube, where it is heated under vacuum from 190° C. to 280° C. This treatment causes considerably more phenol to distill from the reaction mixture. The polyimide is soluble in concentrated sulfuric acid but insoluble in formic acid. It does not melt below 350° C. At that temperature it softens sufficiently that it can be pressed into a film. Inspection of the polymer by infrared proves that the product is largely polyimide. Its inherent viscosity as a 0.5% solution in a degrading solvent such as concentrated sulfuric acid at 30° C. is 0.05.

Examples 2–14

Example 1 is repeated, substituting for the 3-aminophthalic acid, diphenyl ester, of that example the following listed esters to produce the corresponding polyamide-ester and polyimide.

Example No.: Ester

2.—Phenyl methyl ester of 4-aminophthalic acid.
3.—Diphenyl ester of 3-aminonaphthalic acid.
4.—Diphenyl ester of 4-aminophthalic acid.
5.—Diphenyl ester of 2-aminoaphthalic acid.
6.—Diphenyl ester of 4-aminoaphthalic acid.
7.—Di-p-tolyl ester of 3-aminophthalic acid.
8.—Phenyl naphthyl ester of 4-aminophthalic acid.
9.—Phenyl p-tolyl ester of 4-aminoaphthalene-1,2-dicarboxylic acid.
10.—Diphenyl ester of 5-aminonaphthalene-2,3-dicarboxylic acid.
11.—Phenyl methyl ester of 3-aminophthalic acid.
12.—Phenyl ethyl ester of 4-aminophthalic acid.
13.—P-tolyl methyl ester of 3-aminonaphthalic acid.
14.—Methyl naphthyl ester of 3-aminophthalic acid.

Examples 2 and 11 to 14, of course, result in the corresponding alkyl ester of the polyamide acid. The foregoing examples can be repeated as will be readily understood by persons skilled in this art, by substituting other material within the scope of this invention for those of the specific exemplifications.

It is to be understood that the foregoing detailed description is given merely by way of illustration and that many variations may be made therein without departing from the spirit or scope of this invention.

The invention claimed is:

1. An aromatic polyamide-ester polymer consisting essentially of recurring units of the formula

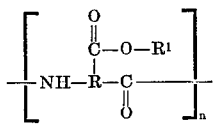

where R is a trivalent aromatic hydrocarbon group of up to 2 rings; $R^1$ is selected from the group consisting of an aryl hydrocarbon group of up to 2 rings and of from 6 through 10 carbon atoms and an alkyl hydrocarbon group; and $n$ is an integer sufficiently high to provide a polymer having an inherent viscosity of at least 0.04 as measured as an 0.5% by weight solution in N,N-dimethylacetamide.

2. An aromatic polyamide-ester as in claim 1 where $R^1$ is

and R is

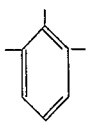

3. An aromatic polyamide-ester as in claim 1 where $R^1$ is

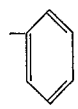

and R is

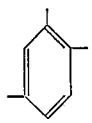

4. An aromatic polyamide-ester as in claim 1 where $R^1$ is

and R is

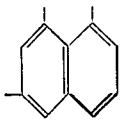

5. An aromatic polyamide-ester as in claim 1 where $R^1$ is methyl and R is

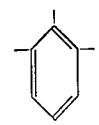

6. An aromatic polyamide-ester as in claim 1 where $R^1$ is ethyl and R is

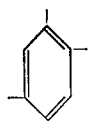

7. A polymer in the shape of a self-supporting film or filament and comprising polymer consisting essentially of recurring units of the formula

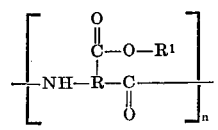

where R is a trivalent aromatic hydrocarbon group of up to 2 rings; $R^1$ is selected from the group consisting of an aryl hydrocarbon group of up to 2 rings and of from 6 through 10 carbon atoms and an alkyl hydrocarbon group and $n$ is an integer sufficiently high to provide a polymer having an inherent viscosity of at least 0.04 as measured as an 0.5% by weight solution in N,N-dimethylacetamide.

8. The process of preparing an aromatic polyamide-ester polymer consisting essentially of recurring units of the formula

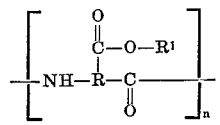

where R is a trivalent aromatic hydrocarbon group of up to 2 rings; $R^1$ is selected from the group consisting of an aryl hydrocarbon group of up to 2 rings and of from 6 through 10 carbon atoms and an alkyl hydrocarbon group; and $n$ is an integer sufficiently high to provide a polymer having an inherent viscosity of at least 0.04 as measured as an 0.5% by weight solution in N,N-dimethylacetamide; said process comprising heating a compound selected from the group consisting of (1) the diaryl esters where each aryl group is a hydrocarbon radical of up to 2 rings and of from 6 through 10 carbon atoms and (2) the monoaryl monoalkyl esters where the monoaryl group is a hydrocarbon radical of up to 2 rings and of from 6 through 10 carbon atoms and the monoalkyl group has up to 5 carbon atoms, of an aminoaryl dicarboxylic acid where aryl of said aminoaryl group is a hydrocarbon radical of up to 2 rings, at a temperature in the range of from about 100° to 200° C. and for a time sufficient to form a polymeric composition containing said polyamide-ester.

9. In the process for preparing shaped articles in which there is heated a compound selected from the group consisting of (1) the diaryl esters where each aryl group is a hydrocarbon radical of up to 2 rings and of from 6 through 10 carbon atoms and (2) the monoaryl monoalkyl esters where the monoaryl group is a hydrocarbon radical of up to 2 rings and of from 6 through 10 carbon atoms and the monoalkyl group has up to 5 carbon atoms, of an aminoaryl dicarboxylic acid where aryl of said aminoaryl group is a hydrocarbon radical of up to 2 rings, at a temperature in the range of from about 100° to 200° C. for a time sufficient to form a polymeric composition containing said polyamide-ester polymer consisting essentially of recurring units of the formula

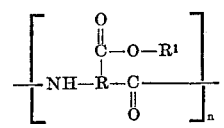

where R is a trivalent aromatic hydrocarbon group of up to 2 rings; $R^1$ is selected from the group consisting of an aryl hydrocarbon group of up to 2 rings and of from 6 through 10 carbon atoms and an alkyl hydrocarbon group; and $n$ is an integer sufficiently high to provide a polymer having an inherent viscosity of at least 0.04 as measured as an 0.5% by weight solution in N,N-dimethylacetamide; and said polymeric composition containing polyamide-ester is shaped into a shaped article; the improvement comprising heating said article at a temperature of at least 175° C. for a time sufficient to convert the polyamide-ester of said article to polyimide.

10. The process as in claim 9 wherein said shaped article is a self-supporting film.

11. The process as in claim 9 wherein said shaped article is a filament.

References Cited

Bogert et al.: American Chemical Society Journal, vol. 30 (1908), pp. 1135–1144.

Jones et al.: Chemistry and Industry, September 1962, pp. 1686–1688.

WILLIAM H. SHORT, *Primary Examiner.*

H. D. ANDERSON, *Assistant Examiner.*